United States Patent [19]
Baldoni et al.

[11] Patent Number: 5,915,611
[45] Date of Patent: Jun. 29, 1999

[54] CONVEYOR ASSEMBLY FOR STRIP MATERIAL

[75] Inventors: Viscardo Baldoni; Giancarlo Scarpetti, both of Rome, Italy

[73] Assignee: Bridgestone Corporation, Tokyo, Japan

[21] Appl. No.: 08/890,899

[22] Filed: Jul. 10, 1997

[30] Foreign Application Priority Data

Jul. 12, 1996 [IT] Italy .................................. T096A0598

[51] Int. Cl.$^6$ ............................................ B65H 43/00
[52] U.S. Cl. .......................... 226/19; 226/172; 242/615.3
[58] Field of Search ............................. 226/17, 19, 172, 226/189; 242/615.3

[56] References Cited

U.S. PATENT DOCUMENTS

| | | |
|---|---|---|
| 3,038,524 | 6/1962 | Bosomworth . |
| 3,269,627 | 8/1966 | O'Brien .......................... 242/615.3 X |
| 3,358,894 | 12/1967 | Hags . |
| 3,393,112 | 7/1968 | Brown . |
| 3,537,936 | 11/1970 | LeBlond ................................. 226/172 |
| 3,844,398 | 10/1974 | Pinat .................................. 226/172 X |
| 3,949,920 | 4/1976 | Habert et al. ..................... 242/615.3 X |
| 4,807,791 | 2/1989 | Cho ......................................... 226/19 |
| 5,524,804 | 6/1996 | Connor .................................... 226/17 |
| 5,551,619 | 9/1996 | Narron .................................... 226/17 |

FOREIGN PATENT DOCUMENTS

| | | |
|---|---|---|
| 0 464 862 A2 | 1/1992 | European Pat. Off. . |
| 2 280 498 | 2/1976 | France . |

OTHER PUBLICATIONS

Patent Abstracts of Japan, vol. 013, No. 052 (M–794), Feb. 7, 1989 & JP 63 258348 A (Fuji Photo Film Co. Ltd.), Oct. 25, 1988.

*Primary Examiner*—Michael Mansen
*Attorney, Agent, or Firm*—D. A. Thomas

[57] ABSTRACT

A conveyor assembly for strip material, wherein a conveyor feeds a strip of material axially through a centering device presenting two guide elements, which are movable into respective positions contacting the strip and symmetrical in relation to a reference axis parallel to the traveling direction of the strip.

4 Claims, 3 Drawing Sheets

CONVEYOR ASSEMBLY FOR STRIP MATERIAL

BACKGROUND OF THE INVENTION

BACKGROUND INFORMATION

The present invention relates to a conveyor assembly for strip material, and is especially advantageous for use on tire forming machines, to which the following description refers purely by way of example.

On machines of the aforementioned type, the carcass of the tire is formed on a collapsible drum to which a green rubber tread ply is supplied by a conveyor assembly.

The conveyor assembly normally features a guide device, which cooperates with the tread ply to keep it as straight as possible as it is fed on to the collapsible drum, and which is normally defined by two centering rollers mounted for rotation about respective axes, perpendicular to the traveling plane of the tread ply, and located in respective fixed positions symmetrical in relation to a reference axis to define a passage of given width.

Known conveyor assemblies of the above type not only present the drawback of forcing the ply through said passage and so subjecting it to harmful transverse deformation, but are also unsuitable for use in systems producing tires of different sizes, in which case, any change in size normally involves dismantling the entire guide device.

Moreover, known conveyor assemblies of the above type normally require the assistance of skilled personnel to insert the tread ply between the centering rollers.

SUMMARY OF THE INVENTION

It is an object of the present invention to provide a conveyor assembly designed to overcome the aforementioned drawbacks.

According to the present invention, there is provided a conveyor assembly for strip material, comprising conveying means for feeding a strip of material in a given direction and through a centering station; and centering means located at said centering station and for positioning said strip coaxially with a reference axis parallel to said direction; the assembly being characterized in that said centering means comprise at least two guide elements positioned symmetrically in relation to said reference axis; and actuating means for moving said guide elements crosswise to said axis, while at the same time maintaining the guide elements in a position symmetrical in relation to said axis.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 2:
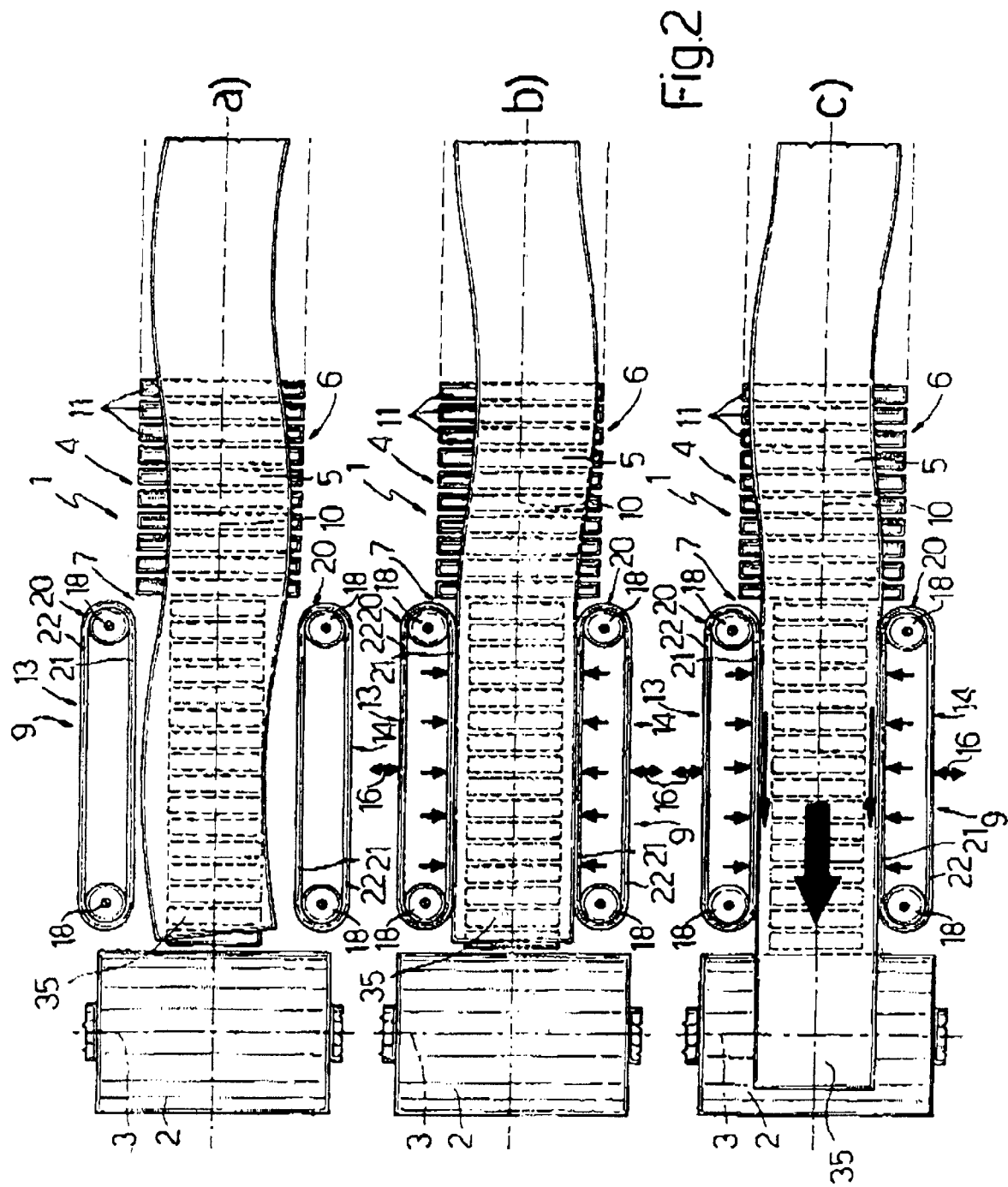
FIG. 2a is a plan view, with parts in section and parts removed for clarity, of the conveyor assembly of FIG. 1 in one operating position.
FIG. 2b is a view similar to FIG. 2a with the conveyor assembly in another operating position.
FIG. 2c is a view similar to FIG. 2a with the conveyor assembly in a further operating position.

Number 1 in FIG. 2 indicates a machine for producing tire carcasses, and which comprises a known collapsible drum 2 mounted for rotation about an axis 3, and a conveyor assembly 4 for feeding a green rubber tread ply 5 to drum 2.

Assembly 4 comprises a conveyor 6 for feeding tread ply 5 to drum 2 through a centering station 7 in a direction 8 perpendicular to axis 3, and along a plane P parallel to axis 3 and tangent to drum 2. Assembly 4 also comprises a centering device 9 located at station 7, presenting a reference axis 10 parallel to direction 8, and for maintaining a portion of ply 5, extending between drum 2 and device 9, in a position coaxial with axis 10.

Conveyor 6 comprises a number of powered rollers 11 mounted for rotation about respective axes parallel to axis 3, and arranged side by side in direction 8 in plane P.

Figure 1:
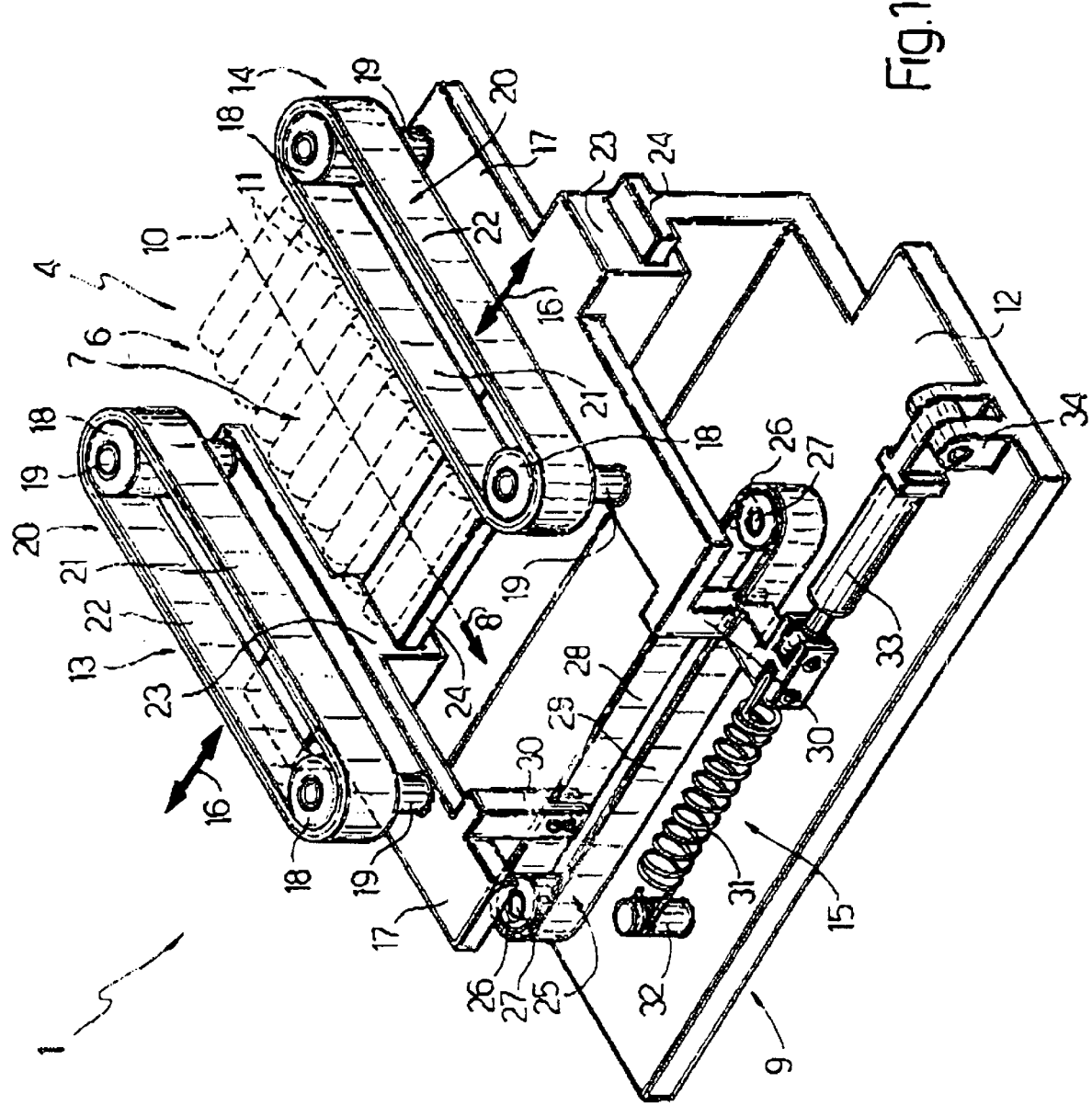
FIG. 1 shows a schematic view in perspective, with parts removed for clarity, of a preferred embodiment of a conveyor assembly in accordance with the present invention.

With reference to FIG. 1, centering device 9 comprises a frame 12 located beneath rollers 11 at station 7; and two guide elements 13 and 14 fitted to frame 12 and located in plane P symmetrically in relation to axis 10. Device 9 also comprises an actuating device 15 for moving elements 13 and 14 towards or away from each other in a direction 16 parallel to axis 3 and crosswise to direction 8, while at the same time maintaining them symmetrical at all times in relation to axis 10.

Each guide element 13, 14 comprises a supporting plate 17 extending parallel to plane P and alongside conveyor 6; a pair of pulleys 18, each mounted for rotation on a pin 19 extending vertically from plate 17 and perpendicularly to plane P; and a belt 20 looped about pulleys 18, which define, on belt 20, an inner branch 21 facing and parallel to axis 10 and to branch 21 of the other belt 20, and an outer branch 22.

Inner branches 21 of belts 20 are located symmetrically in relation to axis 10, and are positioned contacting respective lateral edges 5a of tread ply 5, so as to be drawn along in direction 8 by conveyor 6 via ply 5.

Finally, guide elements 13 and 14 comprise respective slides 23 integral with respective plates 17 and fitted in sliding manner to the same guide 24, which is integral with frame 12 and extends, parallel to direction 16, between frame 12 and rollers 11 of conveyor 6.

With reference to FIG. 1, actuating device 15 comprises a belt 25 looped about a pair of pulleys 26, each mounted for rotation on a pin 27 extending perpendicularly to plane P from frame 12. Pulleys 26 define, on belt 25, two branches 28 and 29, which are perpendicular to plane P, crosswise to axis 10, and each connected to a respective plate 17 by an appendix 30 extending from plate 17.

Device 15 also comprises a spring 31 extending parallel to direction 16 and stretched between one of appendixes 30 and a pin 32 fitted integral with frame 12 close to the other appendix 30; and a linear actuator 33 substantially coaxial with spring 31, located, in relation to spring 31, on the opposite side of the appendix 30 connected to spring 31, and presenting two opposite ends hinged respectively to said appendix 30 and to a fork 34 on frame 12.

Belt 25 provides for synchronizing displacement of guide elements 13 and 14, and for maintaining them symmetrical at all times in relation to axis 10; spring 31 provides for bringing elements 13 and 14 towards each other; and actuator 32 provides for stretching spring 31 to move elements 13 and 14 into an open configuration (FIGS. 2a, 3a, 3b) in which elements 13 and 14 are located at a maximum distance from each other.

Figure 3:
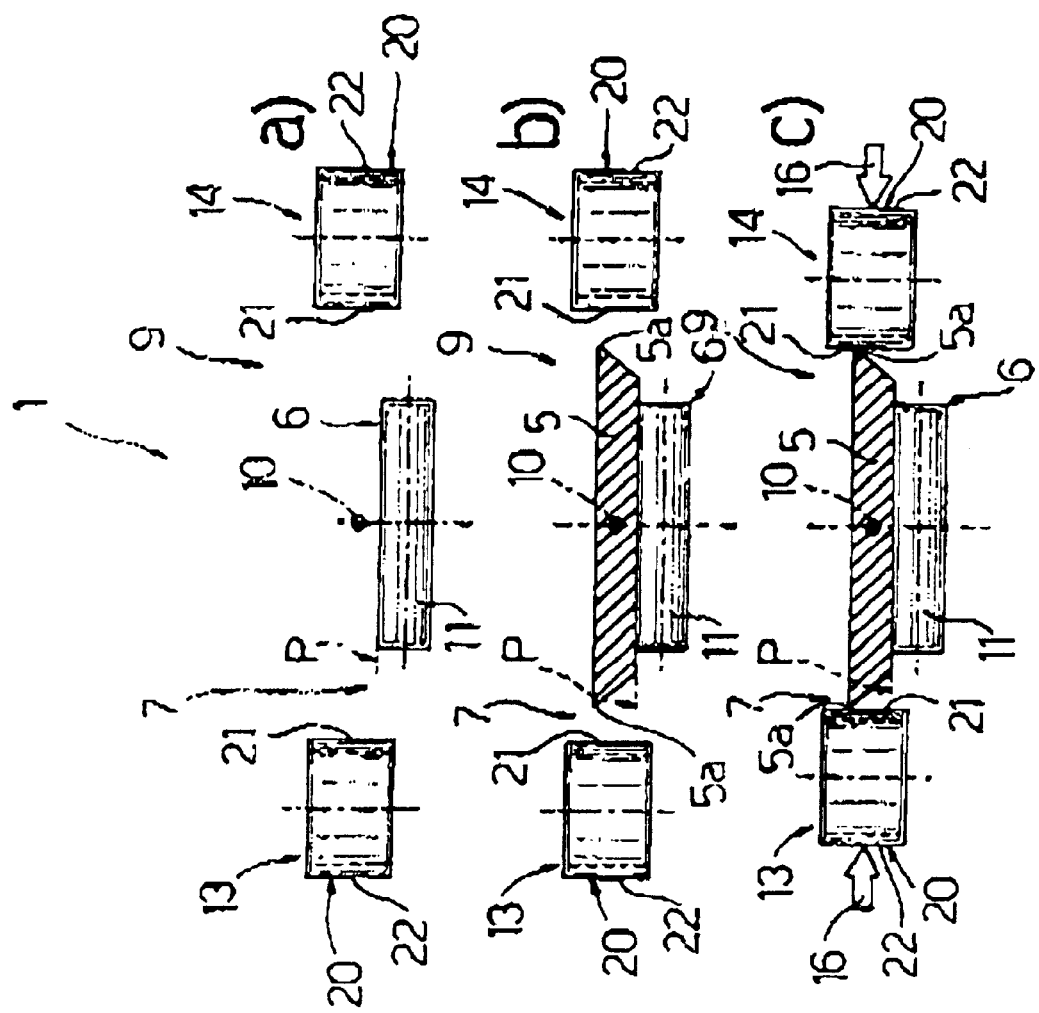
FIG. 3a is a front view, with parts in section and parts removed for clarity of the conveyor assembly of FIG. 1 in one operating position.
FIG. 3b is a view similar to FIG. 3a with the conveyor assembly in another operating position.
FIG. 3c is a view similar to FIG. 3a with the conveyor assembly in a further operating position.

In actual use, elements 13 and 14 are initially maintained in said open configuration (FIG. 3a) until a front end portion 35 of tread ply 5, fed forward by conveyor 6 in direction 8, is located at centering station 7 (FIGS. 2a, 3a). Actuator 32 is then deactivated, and guide elements 13 and 14 moved by spring 31 towards axis 10 and into contact with lateral edges 5a of tread ply 5 (FIGS. 2b, 3c), in which position, the inner branches 21 of belts 20 exert transverse pressure on lateral edges 5a of ply 5 to position and maintain ply 5 coaxial with axis 10.

Once centered, end portion 35 of ply 5 is fed in direction 8 to drum 2 (FIG. 2c), while the rest of ply 5 travels in direction 8 through station 7, and is gradually aligned with direction 8 by elements 13 and 14 so as to be parallel to reference axis 10.

We claim:

1. A conveyor assembly for feeding a strip of material in a given direction onto a collapsible tire building drum, the conveyor assembly comprising:

a frame;

a conveyor adapted to move the strip of material in the given direction;

a pair of guide elements slidably mounted on said frame, said guide elements positioned on either side of said conveyor;

a pair of pulleys mounted on said frame;

a belt looped about said pair of pulleys in an orientation crosswise to the given direction to define two branches of said belt;

one of said guide elements connected to one of said branches and the other of said guide elements connected to the other of said branches;

a linear actuator mounted on said frame and connected to one of said branches; and a spring mounted on said frame connected to one of said branches.

2. The conveyor assembly of claim 1 wherein said spring biases said guide elements toward each other.

3. The conveyor assembly of claim 2 where in said spring is connected to the same branch as said linear actuator.

4. The conveyor assembly of claim 1 where in movement of said belt results in identical but opposite movement of said guide elements.

* * * * *